United States Patent
Iseki et al.

(10) Patent No.: US 7,141,639 B2
(45) Date of Patent: *Nov. 28, 2006

(54) ETHYLENE COPOLYMER

(75) Inventors: Yuki Iseki, Sodegaura (JP); Yasuro Suzuki, Kisarazu (JP); Tadahiro Mitsuno, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 106 days.

This patent is subject to a terminal disclaimer.

(21) Appl. No.: 10/650,035

(22) Filed: Aug. 28, 2003

(65) Prior Publication Data

US 2005/0192417 A1    Sep. 1, 2005

(30) Foreign Application Priority Data

Sep. 2, 2002  (JP)  ............................. 2002-256425
Mar. 28, 2003  (JP)  ............................. 2003-090846

(51) Int. Cl.
*C08F 110/02*  (2006.01)

(52) U.S. Cl. .................. 526/352; 526/348; 526/160; 526/943; 526/127

(58) Field of Classification Search ............. 526/352, 526/348, 160, 943, 127
See application file for complete search history.

(56) References Cited

U.S. PATENT DOCUMENTS 5,374,700 A * 12/1994 Tsutsui et al. ........... 526/348.3
5,700,895 A   12/1997 Kanda et al.
5,849,653 A * 12/1998 Dall'Occo et al. .......... 502/117

FOREIGN PATENT DOCUMENTS

| EP | 640627 A1 | 3/1995 |
|---|---|---|
| JP | 4-213309 | 8/1992 |
| JP | 6-009724 B | 1/1994 |

* cited by examiner

*Primary Examiner*—Ling-Sui Choi
(74) *Attorney, Agent, or Firm*—Fitch, Even, Tabin & Flannery

(57) ABSTRACT

An object of the present invention is to provide an ethylene-α-olefin copolymer excellent in extrusion molding processability and in the balance between the appearance and impact strength. This object is achieved by a copolymer of ethylene and α-olefin of from 4 to 20 carbon atoms having melt flow rate (MFR; unit is g/10 minutes), melt tension at 190° C. (MT; unit is cN), intrinsic viscosity ([η]; unit is dl/g), the chain length A and characteristic relaxation time at 190° C. (τ; unit is sec) which satisfy the specific relations.

8 Claims, No Drawings

ETHYLENE COPOLYMER

This application claims the foreign priority benefit of JP 2002-256425, filed Sep. 2, 2002 and JP 2003-090846, filed Mar. 28, 2003, the complete disclosures of which are incorporated herein by reference.

FILED OF THE INVENTION

The present invention relates to an ethylene-α-olefin copolymer. Further in detail, the present invention relates to an ethylene-α-olefin copolymer excellent in extrusion molding processability and providing an extrusion molded article having excellent balance between appearance and impact strength.

BACKGROUND OF THE INVENTION

Ethylene polymers are conventionally used in a lot of fields, for example, used in extrusion molded articles such as films, sheets and the like. Extrusion molded articles are required be excellent in molding processability controlled by extrusion torque, melt tension and the like, mechanical properties such as rigidity, impact strength and the like, and further, appearances (optical properties) such as the surface smoothness, gloss, transparency and the like of a film or sheet.

For example, Japanese Patent Application No. 4-213309A describes an ethylene copolymers comprising a repeating unit derived from ethylene and a repeating unit derived from an α-olefin having 3 to 20 carbon atoms, wherein the density is from 0.86 to 0.95 g/cm$^3$, MFR is from 0.001 to 50 g/10 minutes, the melt tension and MFR satisfy a specific relation, and the temperature at the position of the maximum peak of a heat absorption curve measured by DSC, and the density satisfy a specific relation, as an example of ethylene copolymers excellent in melt tension and having narrow composition distribution.

The above-mentioned ethylene copolymers described in JP.4-213309A has high melt tension, however, may not necessarily satisfy the requirements regarding the appearance of an extrusion molded article obtained from the copolymers, and there has been desired further improvement in the extrusion molding processability of an ethylene copolymer and in the balance between the appearance and impact strength of an extrusion molded article.

SUMMARY OF THE INVENTION

The present inventors have investigated under the conditions as described above, and resultantly, completed the invention.

The present invention is to provide a copolymer of ethylene and α-olefin of from 4 to 20 carbon atoms having melt flow rate of from 1 to 100, melt tension at 190° C. (MT), intrinsic viscosity ([η]) and a chain length A satisfying following formula (1) to (3), wherein the chain length A is a chain length at peak position of a logarithm normal distribution curve of a component having the highest molecular weight among logarithm normal distribution curves obtained by dividing a chain length distribution curve obtained by gel permeation chromatography measurement into at least two logarithm normal distribution curves, $2 \times MFR^{-0.59} < MT < 20 \times MFR^{-0.59}$   formula (1)

$1.02 \times MFR^{-0.094} \leq [\eta] \leq 1.50 \times MFR^{-0.156}$   formula (2)

$3.30 < \log A < -0.0815 \times \log(MFR) + 4.05$   formula (3)

Another aspect of the present invention relates to a copolymer of ethylene and α-olefin of from 4 to 20 carbon atoms having melt flow rate (MFR; unit is g/10 minutes) of from 1 to 100, melt tension at 190 ° C. (MT; unit is cN), intrinsic viscosity ([η]; unit is dl/g) and characteristic relaxation time at 190 ° C. (τ; unit is sec) satisfying the following formula (1) to (4):

$2 \times MFR^{-0.59} < MT < 20 \times MFR^{-0.59}$   formula (1)

$1.02 \times MFR^{-0.094} \leq [\eta] \leq 1.50 \times MFR^{-0.156}$   formula (2)

$2 < \tau < 8.1 \times MFR^{-0.746}$   formula (4)

DETAILED DESCRIPTION OF THE PRESENT INVENTION

The ethylene-α-olefin copolymer of the present invention is an ethylene-α-olefin copolymer comprising a repeating unit derived from ethylene and a repeating unit derived from an α-olefin having 4 to 20 carbon atoms.

Examples of the α-olefin having 4 to 20 carbon atoms include 1-butene, 4-methyl-1-pentene, 1-hexene, 1-octene, 1-decene and the like. More preferable are 4-methyl-1-pentene and 1-hexene.

The content of the repeating unit derived from ethylene is from 50 to 99 wt % based on the total weight (100 wt %) of an ethylene-α-olefin copolymer. The content of the repeating unit derived from an α-olefin having 4 to 20 carbon atoms is from 1 to 50 wt % based on the total weight (100 wt %) of an ethylene-α-olefin copolymer.

The ethylene-α-olefin copolymer of the present invention may also contain repeating units derived from other monomers than ethylene and α-olefins having 4 to 20 carbon atoms. Examples of other monomers include conjugated dienes (for example, butadiene, isoprene), non-conjugated dienes (for example, 1,4-pentadiene), acrylic acid, acrylates (for example, methyl acrylate, ethyl acrylate), methacrylic acid, methacrylates (for example, methyl methacrylate, ethyl methacrylate), vinyl acetate and the like.

The ethylene-α-olefin copolymer of the present invention is preferably a copolymer of ethylene and α-olefin of 5 to 10 carbon atoms, further preferably a copolymer of ethylene and α-olefin of 6 to 10 carbon atoms. Examples of the copolymer of ethylene-α-olefin include ethylene-1-hexene copolymer, ethelene-4-methyl-1-pentene copolymer and ethylene-1-octene copolymer, and among them, ethylene-1-hexene copolymer is preferable. Further, copolymers of ethylene, α-olefin of 6 to 10 carbon atoms and 1-butene is preferable, and include ethylene-1-butene-1-hexene copolymer, ethylene-1-butenen-4-methyl-1-pentene copolymer and ethylene-1-butene-1-octene copolymer. Among them, ethylene-1-butene-1-hexene copolymer is preferable.

The ethylene-α-olefin copolymer of the present invention has a melt flow rate (MFR; unit is g/10 minutes) of usually from 1 to 100 g/10 minutes, preferably from 1 to 20 g/10 minutes, more preferably from 1.2 to 10 g/10 minutes, further preferably from 1.4 to 10 g/60 minutes. The melt flow rate (MFR; unit is g/10 minutes) is measured under a load of 21.18 N (2.16 Kg) at 190° C. according to a method defined by JIS K7210-1995. When MFR is measured, a polymer to which antioxdant has been previously added is used.

The ethylene-α-olefin copolymer of the present invention is a copolymer of which melt flow rate and melt tension at 190° C. (MT; unit is cN) satisfy the relation of the following formula (1).

$$2 \times MFR^{-0.59} < MT < 20 \times MFR^{-0.59} \quad \text{formula (1)}$$

The ethylene-α-olefin copolymer of the present invention satisfies the relation of the formula (1), and the copolymer of the present invention is excellent in extrusion molding processability. When the relation of $2 \times MFR^{-0.59} < MT$ is not satisfied in the formula (1) in the case where, for example, melt tension is too low, extrusion molding processability may deteriorate, and when the relation of $MT < 20 \times MFR^{-0.59}$ is not satisfied in the formula (1) in the case where, for example, melt tension is too high, a taking over process at high speed may be difficult.

The relational formula satisfied by the ethylene-α-olefin copolymer of the present invention is preferably, $$2.2 \times MFR^{-0.59} < MT < 15 \times MFR^{-0.59}$$

further preferably, $$2.5 \times MFR^{-0.59} < MT < 10 \times MFR^{-0.59}.$$

The melt tension (MT; unit is cN) in the above-mentioned formula (1) is measured as follows: a melted resin is extruded through an orifice having a diameter of 2.09 mmϕ and a length of 8 mm with a piston at an extrusion speed of 5.5 mm/min at 190° C. using a melt tension tester sold from, for example, Toyo Seiki Seisakusho, and the above-mentioned strand is taken up using a roller having a diameter of 50 mm while increasing rotation speed at a rate of 40 rpm/min per minute. A value of tension which the strand shows just before breaking is regarded as the melt tension in formula (1).

The ethylene-α-olefin copolymer of the present invention is a copolymer in which intrinsic viscosity ($[\eta]$; unit is dl/g) and the above-mentioned MFR satisfy the relation of the following formula (2).

$$1.02 \times MFR^{-0.094} < [\eta] < 1.50 \times MFR^{-0.156} \quad \text{formula (2)}$$

The ethylene-α-olefin copolymer of the present invention satisfies the relation of the following formula (2), and the copolymer of the present invention has low extrusion torque and excellent in extrusion molding processability. When the relation of $1.02 \times MFR^{-0.094} < [\eta]$ is not satisfied in the formula (2) in the case where, for example, intrinsic viscosity ($[\eta]$) is too low, impact strength may decrease, and when the relation of $[\eta] < 1.50 \times MFR^{-0.156}$ is not satisfied in the formula (2) in the case where, for example, intrinsic viscosity is too high, extrusion torque may be high and extrusion molding processability may be poor.

The relational formula satisfied by the ethylene-α-olefin copolymer of the present invention is preferably, $$1.05 \times MFR^{-0.094} < [\eta] < 1.47 \times MFR^{-0.156},$$

further preferably, $$1.08 \times MFR^{-0.094} < [\eta] < 1.42 \times MFR^{-0.156}.$$

The intrinsic viscosity ($[\eta]$; unit is dl/g) in the above-mentioned formula (2) is obtained as follows. 100 mg of an ethylene-α-olefin copolymer is dissolved at 135° C. in 100 ml of tetralin containing 5 wt % of butylhydroxytoluene (BHT) as a heat degradation preventing agent to prepare a sample solution, relative viscosity (η rel) at 135° C. is calculated from falling times of the above-mentioned sample solution and blank solution using a Ubbellohde viscometer, then, intrinsic viscosity is calculated. The blank solution is tetralin containing 5 wt % of BHT as a heat degradation preventing agent.

$$[\eta] = 23.3 \times \log(\eta rel)$$

The melt flow rate (MFR; unit is g/10 minutes) in the formula (2) is the same as the melt flow rate (MFR) used in the formula (1).

The ethylene-α-olefin copolymer of the present invention is a copolymer having the chain length A satisfying the following formula (3). The chain length (A) is a chain length at peak position of a logarithm normal distribution curve of a component having the highest molecular weight among logarithm normal distribution curves obtained by dividing a chain length distribution curve obtained by gel permeation chromatography measurement into at least two logarithm normal distribution curves.

$$3.30 < \log A < -0.0815 \times \log(MFR) + 4.05 \quad \text{formula (3)}$$

The ethylene-α-olefin copolymer of the present invention satisfies the relation of the above-mentioned formula (3) and the copolymer of the present invention has low extrusion torque and excellent in extrusion molding processability, further, excellent in the appearance of an extrusion molded article such as a film and the like.

The relational formula satisfied by the ethylene-α-olefin copolymer of the present invention is preferably, $$3.30 < \log A < -0.0815 \times \log(MFR) + 4.03,$$

further preferably, $$3.30 < \log A < -0.0815 \times \log(MFR) + 4.02.$$

The chain length distribution curve is obtained by gel permeation chromatography measurement under the following conditions.

(1) Apparatus: Waters 150 C manufactured by Water
(2) Separation column: TOSOH TSKgel GMH-HT
(3) Measuring temperature: 145° C.
(4) Carrier: orthodichlorobenzene
(5) Flow rate: 1.0 mL/min
(6) Injection amount: 500 μL Distribution of chain length distribution curve is conducted as described below.

First, a chain length distribution curve in which weight ratio (y value) dW/d(log Aw) is plotted against log Aw (x value), which is logarithm of chain length Aw, is measured by gel permeation chromatography measurement. The number of data plotted is more than 300 so as to obtain a continuous distribution curve. Next, four logarithm normal distribution curves (x-y curve) having a standard deviation of 0.30 and an arbitrary average value (usually, corresponding to chain length A at peak position) to the above-mentioned x value are added in arbitrary ratio, to produce a synthetic curve. Further, the average value and the ratio are determined so that the squared deviation sum of a difference between y value of the actually measured chain length distribution curve ($y_{obs}$) and that of synthetic curve ($y_{cal}$) is the minimum value, both of which are plotted against the same x value. It is preferable that the squared deviation sum is as small as possible and usually, it is not more than 0.5% of the squared deviation sum of $Y_{obs}$.

When the average value and the ratio giving the minimum squared deviation sum are obtained, log A is calculated from chain length A at a peak position of a logarithm normal distribution curve of a component having the highest molecular weight among logarithm normal distribution curves obtained by division into four logarithm normal distribution curves. The ratio of logarithm normal distribution curve of a component having the highest molecular weight is usually not less than 10% of the synthetic curve.

The ethylene-α-olefin copolymer of the present invention is a copolymer in which characteristic relaxation time at 190° C. (τ; unit is sec) and the above-mentioned MFR satisfy the relation of the following formula (4).

$$2<\tau<8.1 \times MFR^{-0.746} \quad \text{formula (4)}$$

The ethylene-α-olefin copolymer of the present invention satisfies the relation of the above-mentioned formula (4) and the copolymer of the present invention has low extrusion torque and excellent in extrusion molding processability, further, excellent in the appearance of an extrusion molded article such as a film and the like.

The relational formula satisfied by the ethylene-α-olefin copolymer of the present invention is preferably, $$2<\tau<7.9 \times MFR^{-0.746},$$

further preferably, $$2<\tau<7.8 \times MFR^{-0.746}.$$

The characteristic relaxation time (τ) at 190° C. is a numerical value calculated by approximating a master curve with the following cross formula. A master curve is obtained by shifting dynamic viscoelasticity date at each temperature T(K) measured under the following conditions using Rheometrics Mechanical Spectrometer RMS-800 manufactured by Rheometrics as a viscoelasticity measuring apparatus based on the temperature-time superposition theory to give a master curve showing the dependency of dynamic viscosity at 190° C. (η; unit is Pa·sec) on shearing speed (ω: unit is rad/sec) Measuring conditions of dynamic viscoelasticity data at each temperature T(K)

(4) Geometry: parallel plate, diameter: 25 mm, plate interval: 1.5 to 2 mm
(2) Strain: 5%
(3) Shearing speed: 0.1 to 100 rad/sec
(4) Temperature: 190, 170, 150, 130° C.

Into a sample, an antioxidant such as Irganox 1076 and the like is previously added in suitable amount (for example, 1000 ppm or more), and measurements are all conducted under nitrogen.

Cross Approximation Formula $$\eta=\eta 0/[1+(\tau \times \omega)^{n-1}]$$

(η0 and n are constants obtained by measurement of dynamic viscoelasticity data of ethylene-α-olefin copolymer, like the characteristic relaxation time τ).

As the calculation software for obtaining a master curve and approximation of a cross formula, Rhios V.4.4.4 manufactured by Rheometrics is used.

The above-mentioned molecular weight distribution is a value obtained by calculating the weight-average molecular weight (Mw) and the number-average molecular weight (Mn) each converted into polystyrene molecular weight the chain length distribution obtained by the above-mentioned gel permeation chromatography measurement, and dividing Mw by Mn (Mw/Mn).

The density of the ethylene-α-olefin copolymer of the present invention is usually from 890 to 970 kg/cm³ and a value measured according to a method defined in JIS K6760-1981. The above-mentioned density is preferably from 905 to 940 kg/M³, more preferably from 907 to 930 kg/m³ from the viewpoint of balance of the rigidity and impact strength of a film obtained from the ethylene-α-olefin copolymer of the present invention.

The activation energy (Ea; unit is kJ/mol) of flow of the ethylene-α-olefin copolymer of the present invention is, from the viewpoint of flowability, preferably larger than 40 kJ/mol, more preferably 45 kJ/mol or more, further preferably 50 kJ/mol or more. And the activation energy is usually 120 or less.

The above-mentioned activation energy (Ea) of flow is a numerical value calculated according to the Arrhenius type equation of the following shift factor (aT) by shifting dynamic viscoelasticity date at each temperature T(K) measured under the same conditions as in calculation of characteristic relaxation time (τ) using Rheometrics Mechanical Spectrometer RMS-800 manufactured by Rheometrics as a viscoelasticity measuring apparatus based on the temperature-time superposition theory, and used as an index for moldability.

Arrhenius Type Equation of Shift Factor ($a_T$)

$$\log(a_T)=Ea/R(1/T-1/T_0)$$

(R is a gas constant, and T0 is a standard temperature (463 K))

As the calculation software, Rhios V.4.4.4 manufactured by Rheometrics is used, and Ea value when correlation factor r² obtained in linear approximation is 0.99 or more in Arrhenius type plot log ($a_T$)–(1/T) is used as the activation energy of flow of the ethylene-α-olefin copolymer of the present invention.

The melt flow rate ratio (MFRR) of the ethylene-α-olefin copolymer of the present invention is, from the viewpoint of flowability, usually 60 or more, and an ethylene-α-olefin copolymer having a melt flow rate ratio (MFRR) of 60 or more has low extrusion torque and excellent in extrusion molding processability. MFRR is usually 300 or less.

The above-mentioned melt flow rate ratio (MFRR) is a valued obtained by dividing a melt flow rate value measured at 190° C. under a load of 211.82 N (21.60 kg) by a melt flow rate value measured under a load of 21.18 N (2.16 kg) according to JIS K7210-1995. For the above-mentioned melt flow rate measurement, a polymer into which 1000 ppm of an antioxidant had been previously added was used.

When the density of the ethylene-α-olefin copolymer of the present invention is not more than 927 kg/m³, the ethylene-α-olefin copolymer usually has at least two melting points (unit is ° C.) from the view point of heat resistance, and the maximum melting point (Tmax) is 115° C. or more, preferably 118° C. or more. In the case where the ethylene-α-olefin copolymer has one melting point below 115° C., it contains fusion component above 118° C.

The above-mentioned melting point includes fusion peak temperatures observed, in compacting 8 to 12 mg of a sample into an aluminum pan, keeping the sample at 150° C. for 2 minutes, then, cooling the sample down to 40° C. at 5° C./min, keeping the sample at 40° C. for 2 minutes, then, heating the sample up to 150° C. at 5° C./min, using a differential scanning type calorimeter DSC-7 type apparatus manufactured by Perkin Elmer. Among them, temperature at a fusion peak position of the highest temperature is the maximum melting point (Tmax).

The method of producing an ethylene-α-olefin copolymer of the present invention includes a method in which ethylene and an α-olefin are copolymerized under a hydrogen condition using the following metallocene olefin polymerization catalyst.

The metallocene olefin polymerization catalyst used in producing an ethylene-α-olefin copolymer of the present invention include, for example, a catalyst obtained by contacting a co-catalyst carrier (A), cross-linking type bisindenylzirconium complex (B) and organoaluminum compound (C), and the above-mentioned co-catalyst carrier (A) is a carrier obtained by contacting diethylzinc (a), fluorinated phenol (b), water (c), silica (d) and trimethyldisilazane $(((CH_3)_3Si)_2NH)$ (e).

The amounts of the above-mentioned compounds (a), (b) and (c) are not particularly restricted, and when the molar ratio (a):(b):(c) of the use amounts the compounds is 1:y:z, it is preferable that y and z satisfy substantially the following formula (5).

$$|2-y-2z| \leq 1 \qquad \text{formula (5)}$$

In the above-mentioned formula (5), y represents a number of preferably from 0.01 to 1.99, more preferably from 0.10 to 1.80, further preferably from 0.20 to 1.50, most preferably from 0.30 to 1.00.

Regarding the amount of (d) based on (a), the amount of a zinc atom derived from (a) contained in particles obtained by contact of (a) and (d) is preferably 0.1 mmol or more, more preferably 0.5 to 20 mmol in terms of molar number of zinc atoms contained in 1 g of the resulted particles. Regarding the amount of (e) based on (d), the amount of (e) is preferably 0.1 mmol or more, more preferably 0.5 to 20 mmol per g of (d).

The cross-linking bisindenylzirconium complex (B) is preferably racemi-ethylenebis(1-indenyl)zirconium dichloride, or racemi-ethylenebis(1-indenyl)zirconium diphenoxide.

The organoaluminum compound (C) is preferably triisobutylaluminum or tri-n-octylaluminum.

The use amount of the cross-linking bisindenylzirconium complex (B) is preferably $5 \times 10^{-6}$ to $5 \times 10^{-4}$ mol per g of the co-catalyst carrier (A). The amount of the organoaluminum compound (C) is preferably from 1 to 2000 in terms of the ratio (Al/Zr) of the molar number of an aluminum atom in the organoaluminum compound (C) to the molar number of a zirconium atom in the cross-linking bisindenylzirconium complex (B).

The polymerization method includes, for example, gas phase polymerization, slurry polymerization and bulk polymerization, and gas phase polymerization is preferable.

The gas phase polymerization reaction apparatus is usually an apparatus having a fluidized bed type reaction vessel, and preferably an apparatus having a fluidized bed type reaction vessel having an enlarge portion. A stirring blade may be installed in the reaction vessel.

As the method of feeding components of a metallocene olefin polymerization catalyst used in production of an ethylene-α-olefin copolymer of the present invention, there are usually used a method in which components are fed using an inert gas such as nitrogen, argon and the like, or hydrogen, ethylene and the like under condition of no water, and a method in which components are dissolved or diluted in a solvent and fed in the form of solution or slurry. Components of the catalyst may be individually fed, or any components may be previously contacted in any order before feeding.

It is preferable that, before effecting the polymerization, previous polymerization is conducted, and the previously polymerized catalyst components are used as the catalyst components or catalyst for the polymerization.

The polymerization temperature is usually less than the temperature at which a copolymer is melted, and preferably from about 0 to about 150° C., more preferably from about 30 to about 100° C.

For the purpose of controlling the melt flowability of a copolymer, hydrogen may be added as a molecular weight controlling agent. An inert gas may co-exist in a mixed gas. It is supposed that the ethylene-alpha-olefin copolymer of the present invention has polymer structure of long chain branching.

Further, it is supposed that the polymer structure of like a long chain branching which is entangled closely is preferable.

The higher activation energy for a melt flow than the conventional ethylene-α-olefin copolymer is obtained due to such structure of long chain branching entangled closely, and its extrusion property is further improve.

As mentioned above, the higher activation energy for a melt flow of ethylene-α-olefin copolymer (Ea, a unit being kJ/mols.) having polymer structure of long chain branching which is entangled closely is preferably not less than 60 kJ/more from a viewpoint of raising melting tension at lower temperature and obtaining sufficient molding processability. Not less than 63 kJ/mol is more preferable, and not less than 66 kJ/mol most preferable.

When Ea is less than 60 kJ/mol, sufficient molding processability may not be obtained since melting tension is not raised easily at lower temperature.

Moreover, Ea is preferably not more than 100 kJ/mol, and more preferably not more than 90 kJ/mol. When Ea exceeds 100 kJ/mol, melt viscosity of the ethylene-α-olefin copolymer may decrease too much at high temperature and may not have good molding processability. Resultantly, the surface of article obtained by extruding the ethylene-α-olefin copolymer, such as a film, is ruined, and its appearance may be deteriorated remarkably.

A preferable ethylene-α-olefin copolymer of the present invention having polymer structure of long chain branching which is considered to be entangled closely as mentioned above is a copolymer having a swell ratio (SR) and intrinsic viscosity ([eta]; unit dL/g) satisfying following formula (6) or (7).

When $[\eta]<1.20$, $-0.9 \times [\eta]+2.262<SR<2$ Formula (6)

When $[\eta] \geq 1.20$, $1.17<SR<2$ Formula (7)

It is known that there is a relation between intrinsic viscosity and SR of an ethylene-α-olefin copolymer, and that, for example, SR is increasing with the decrease of intrinsic viscosity.

A preferable ethylene-α-olefin copolymer of the present invention is considered to be a polymer having a structure of like long chain branching which are entangled closely. And it is considered that SR of ethylene-α-olefin copolymer of the present invention is higher than that of the conventional ethylene-α-olefin copolymer having as same intrinsic viscosity as the ethylene-α-olefin copolymer of the present invneiotn due to such structure, and [η] and SR of the ethylene-α-olefin copolymer of the present invention satisfies an above-mentioned formula (6) or an above-mentioned formula (7).

If the ethylene-α-olefin copolymer of the present invention satisfies the relation between the above-mentioned formula (6) or a formula (7), extrusion torque of the ethylene-α-olefin copolymer is low and its stability during extrusion processing is excellent. Further, extruded articles such as film obtained from the ethylene-α-olefin copolymer is excellent in appearance without roughness occurring on its surface.

The relational formula satisfied by the ethylene-α-olefin copolymer of the present invention is preferably, when $[\eta]<1.23$, $-0.91\times[\eta]+2.289<SR<1.9$, or when $[\eta]\geq1.23$, $1.17<SR<1.9$, and further preferably, when $[\eta]<1.30$, $-0.91\times[72]+2.353<SR<1.8$, or $[\eta]\geq1.30$, $1.17<SR<1.8$.

The swell ratio (SR) in the above-mentioned formula (5) is the value obtained by dividing a diameter D measured at any point between 1 and 6 mm from the tip of strand by the diameter (D0) of an orifice with 2.095 mm (D/D0), wherein the strand is obtained by extruding in the shape of a strand during measuring above mentioned MFR at 190° C. under 21.18 Ns (2.16 kg) of loads and solidified by cooling it. The diameter D is obtained as an average of three strand samples.

The preferable ethylene-α-olefin copolymer of this invention, that is, the ethylene-α-olefin copolymer having Ea is not less than 60 kJ/mol, or satisfying the above-mentioned formula (6) or a formula (7) and being considered to have the structure of like a long chain branching entangled closely are produced by copolymerization of ethylene and α-olefin under hydrogen using the olefin polymerization catalyst such as metallocene, and then by extruding it with the following continuous-extrusion method. One of the methods is the method of producing continuously strands using the extruder equipped with the extensional flow mixing (EFM) die developed by Utracki et. al. disclosed in U.S. Pat. No. 5,451,106, cutting continuously the strand, and forming pellets.

Other method is the method of producing continuously strands using a counterrotating twin screw extruder equipped with a gear pump, cutting the strand continuously, and forming pellets. As for the latter, it is preferable that the extruder has a resident zone between the screw zone and a die.

The ethylene-α-olefin copolymer of the present invention is preferably used in an extrusion molded article such a film, sheet and the like.

The method of forming a film includes, for example, an inflation film molding processing method in which an ethylene-α-olefin copolymer of the present invention is melted, extruded from a circular die and swollen in the form of cylinder to give a film, and this film is taken up, a T die film molding processing method in which an ethylene-α-olefin copolymer of the present invention is melted, extruded from a linear die to give a film, and this film is taken up, and other methods.

The ethylene-α-olefin copolymer of the present invention may be added by known additives if necessary. Examples of the additives include an antioxidant, weather resistant agent, lubricant, anti-blocking agent, antistatic agent, defogging agent, non-dripping agent, pigment, filler and the like.

As described in detail above, according to the present invention, it is possible to obtain an ethylene-α-olefin copolymer excellent in extrusion molding processability, appearance of an extrusion molded article, impact strength and balance.

EXAMPLES

Next, the present invention will be illustrated based on examples and comparative examples, but is not limited by these examples.

The appearance of an extrusion molded article in examples was evaluated using a film obtained by the following method.

(1) Film Processing

A ethylene-α-olefin copolymer was used and processed using a full flight type screw mono-axial extruder of 30 mm φ and L/D=28 manufactured by Placo K.K., a dice of 50 mm φ and a lip gap of 0.8 mm, and a double slit air ring, under conditions of a processing temperature of 170° C., an extrusion rate of 5.5 kg/hr, a frost line distance (FLD) of 200 mm and a blow ratio of 1.8, to obtain a film having a thickness of 30 μ.

(3) Fish Eye

The frequency of projections (fish eyes) on the surface of the film obtained above was observed visually. When 100 or less fish eyes are found per m², evaluation is ◯, when 100 to 1000 fish eyes are found, Δ, and when 1000 or more fish eyes are found, ×.

(4) Haze (Degree of Mist)

The haze value of the film obtained above was measured according to a method defined in ASTM D1003. When this value is smaller, transparency is more excellent.

(5) Tensile Impact (TI) Strength (Unit: kJ/m²)

The tensile impact strength was measured according to a method defined in ASTM D1822-68.

Example 1

[Preparation of Catalyst Component]

(1) Treatment of Silica

Into a 3 liter four-necked flask purged with nitrogen was charged 0.2 kg of silica heat-treated at 300° C. under nitrogen flow (Sylopol 948 manufactured by Devison; average particle size=61 μm; fine pore capacity=1.70 ml/g; specific surface area=291 m²/g), then, 1.2 liter of toluene was added while washing off silica adhered to the wall surface of the flask. The mixture was cooled to 5° C., then, a mixed solution of 84.4 ml (0.4 mmol) of 1,1,1,3,3,3-hexamethyldisilazane and 115 ml of toluene was dropped over 25 minutes. After completion of dropping, the mixture was stirred at 5° C. for 1 hour and at 95° C. for 3 hours and filtrated. Thereafter, washing using a filter was conducted four times at 95° C. with 1.2 liter of toluene. Next, 1.2 liter of toluene was added, then, the mixture was allowed to stand still overnight.

(2) Synthesis of Co-Catalyst Carrier (A1)

Into the slurry obtained above was charged 0.550 liter (1.10 mol) of a hexane solution of diethylzinc (2.00 mol/liter) and the mixture was cooled to 5° C. Into this, a solution prepared by dissolving 105 g (0.570 mol) of pentafluorophenol in 173 ml of toluene was dropped over 65 minutes. After completion of dropping, the mixture was stirred at 5° C. for 1 hour. Then, the mixture was heated to 40° C., and stirred for 1 hour. The temperature was lowered to 5° C. in an ice bath, then, 14.9 g (0.828 mol) of H₂O was dropped over 90 minutes. After completion of dropping, the mixture was stirred at 5° C. for 1.5 hours and at 40° C. for 2 hours. Then, the mixture was allowed to stand still overnight at room temperature. Thereafter, the mixture was stirred at 80° C. for 2 hours, then, allowed to stand still to cause precipitation of solid components, and when the interface of a layer of the precipitated solid components and an upper layer, slurry part was observed, the upper layer, slurry part was removed, then, the remaining liquid component was filtrated through a filter, then, to this was added 1.7 liter of toluene and the mixture was stirred at 95° C. for 2 hours. Thereafter, the mixture was stirred with 1.7 liter of toluene at 95° C. four times and with 1.7 liter of hexane at room temperature twice, respectively, then, allowed to stand still to cause precipitation of solid components, and when the interface of a layer of the precipitated solid components and an upper layer, slurry part was observed, the upper layer, slurry part was removed, then, washing of filtrating the remaining liquid component with a filter was conducted. Then, the solid components were dried under reduced pressure at room temperature for 3 hours to obtain 0.39 kg of a co-catalyst carrier (A1).

[Preparation of Polymerization Pre-Catalyst]

Into a previously nitrogen-purged autoclave having a content volume of 210 liter equipped with a stirrer was charged 100 liter of butane containing triisobutylaluminum at a concentration of 2.5 mmol/liter, 0.5 liter of 1-butene and 8 liter of hydrogen under normal temperature and normal pressure, then, the autoclave was heated up to 23° C. Further, ethylene was charged in an amount corresponding to 0.2 MPa of gas phase pressure in the autoclave, and after stabilization in the system, 250 mmol of triisobutylaluminum, 30 mmol of racemi-ethylenebis(1-indenyl)zirconium diphenoxide, subsequently, 0.20 kg of the above-mentioned co-catalyst carrier (A1), were added to initiate polymerization. The mixture was heated up to 30° C. and, previous polymerization at 30° C. for a total time of 4 hours was conducted while continuously feeding ethylene and hydrogen. After completion of polymerization, ethylene, butane, hydrogen gas and the like were purged and the remaining solid was dried under vacuum at room temperature, to obtain a catalyst component in which 58 g of ethylene-1-butene copolymer had been previously polymerized per g of the above-mentioned co-catalyst carrier (A1).

[Polymerization]

Using the polymerized pre-catalyst component obtained above, copolymerization of ethylene and 1-hexene was conducted in a continuous type fluidized bed gas phase polymerization apparatus. The polymerization conditions included a temperature of 85° C., a total pressure of 2 MPa, a gas linear velocity of 0.24 m/second, a hydrogen molar ratio to ethylene of 0.8% and a 1-hexene molar ratio to ethylene of 1.5%, and during the polymerization, ethylene, 1-hexene and hydrogen were continuously fed for maintaining the gas composition constant. The above-mentioned previously polymerized catalyst component and tri-isobutylaluminum were fed continuously, and an ethylene-1-hexene copolymer was obtained at an average polymerization time of 4 hr and a production efficiency of 23 kg/hr, so as to maintain a total powder weight in the fluidized bed of 80 kg constant. To the powder of ethylene-1-hexene copolymer thus obtained, 1000 ppm of calcium stearate and Sumilizer GP (manufacture by Sumitomo Chemical) were added, the mixture obtained was extruded with full-flight single screw extruder having 40mm φ, L/D=28 (manufactured by Tanabe plastic Co.) at 150° C. and 80 rpm of the screw rotatory to obtain ethylene-1-hexene copolymer. The obtained ethylene-1-hexene copolymer showed physical properties and film appearance as shown in Table 1.

Example 2

[Preparation of Polymerized Pre-Catalyst]

In the same manner as in Example 1, a catalyst component was obtained in which 47 g of ethylene-1-butene copolymer had been previously polymerized per g of the co-catalyst carrier (A1).

[Polymerization]

Using the polymerized pre-catalyst component obtained above, copolymerization of ethylene and 1-hexene was conducted in a continuous type fluidized bed gas phase polymerization apparatus, in the same manner as in Example 1. The obtained ethylene-1-hexene copolymer showed physical properties and film appearance as shown in Table 1.

Powder of ethylene-1-hexene copolymer was obtained in the same manner as Example 1, except that a catalyst component in which 13 g of ethylene-1-butene copolymer had been previously polymerized per g of the co-catalyst carrier (A) was used and polymerization was conducted at 75° C., a hydrogen molar ratio to ethylene of 1.55% and a 1-hexene molar ratio to ethylene of 1.0%.

Mixing (I1211201)

To the powder of ethylene-1-hexene copolymer obtained above, 1000 ppm of calcium stearate and Sumilizer GP (manufacture by Sumitomo Chemical) were added, the mixture obtained was extruded with LCM100 extruder (manufactured by Kobe Steel Ltd.) under the condition where the feed speed was 350 kg/hr, the screw rotatory was 450 rpm, the opening degree of gate was 4.2 mm, the suction pressure was 0.2 Mpa and the resin temperature was from 200 to 230° C., to obtain ethylene-1-hexene copolymer. The property and molding processability of the obtained ethylene copolymer are shown in Table 1.

Example 4

(PL1065/GPE1843/I211203)

Powder of ethylene-1-butene-1-hexene copolymer was obtained in the same manner as Example 3 using the polymerized pre-catalyst component obtained in Example 3, except that polymerization was under a hydrogen molar ratio to ethylene of 1.9% and a 1-hexene molar ratio to ethylene of 0.28%. The property and molding processability of the obtained ethylene copolymer are shown in Table 1.

Example 5

(PL1050/GPE1802/I28206)

Powder of ethylene-4-methyl-1-pentene copolymer was obtained in the same manner as Example 3, except that a catalyst component in which 34 g of ethylene-1-butene copolymer had been previously polymerized per g of the co-catalyst carrier (A) was used and polymerization was conducted at 85° C., a hydrogen molar ratio to ethylene of 0.8% 4-methyl-1-pentene was used in stead of 1-hexene and a 4-methyl-1-pentene molar ratio to ethylene of 2.6%. The property and molding processability of the obtained ethylene-4-methyle-1-pentene copolymer are shown in Table 1.

Preparation of Co-Catalyst Carrier (A2)

Into a nitrogen-purged 5 liter four-necked flask was charged 1.5 liter of tetrahydrofuran and 1.35 liter (2.7 mol) of a hexane solution of diethylzinc (2 mol/liter), and the mixture was cooled to 5° C. Into this, a solution prepared by dissolving 0.2 kg (1 mol) of pentafluorophenol in 500 ml of tetrahydrofuran was dropped over 60 minutes. After completion of dropping, the mixture was stirred at 5° C. for 60 minutes, and the mixture was heated to 45° C. over 28 minutes, and stirred for 60 minutes. Then, the temperature was lowered to 20° C. in an ice bath, then, 45 g (2.5 mol) of water was dropped over 90 minutes. Then, the mixture was stirred at 20° C. for 60 minutes and heated up to 45° C. over 24 minutes, and the mixture was stirred for 60 minutes. Thereafter, the solvent was distilled off under reduced pressure for 120 minutes while raising the temperature from 20° C. to 50° C., then, the mixture was dried under reduced pressure at 120° C. for 8 hours. As a result, 0.43 kg of a solid product was obtained.

Into a 5 liter four-necked flask purged with nitrogen was charged 0.43 kg of the above-mentioned solid product and 3 liter of tetrahydrofuran, and the mixture was stirred. To this was added 0.33 kg of silica heat-treated at 300° C. under nitrogen flow (Sylopol 948 manufactured by Devison; average particle size=61 μm; fine pore capacity=1.61 ml/g; specific surface area=296 m$^2$/g). The mixture was heated up to 40° C. and stirred for 2 hours, then, allowed to stand still to cause precipitation of solid components, and when the interface of a layer of the precipitated solid components and an upper layer, slurry part was observed, the upper layer, slurry part was removed. As the washing operation, to this was added 3 liter of tetrahydrofuran, and the mixture was stirred, then, allowed to stand still to cause precipitation of solid components, and when the interface was observed as described above, the upper layer, slurry part was removed. The above-mentioned washing operation was repeated five times. Thereafter, the mixture was dried at 120° C. for 8 hours, to obtain 0.52 kg of a co-catalyst carrier (A2)

[Preparation of Polymerization Pre-Catalyst]

Into a previously nitrogen-purged autoclave having a content volume of 210 liter equipped with a stirrer was charged 80 liter of butane containing tri-isobutylaluminum at a concentration of 2.5 mmol/liter, and 28 liter of hydrogen under normal temperature and normal pressure, then, the autoclave was heated up to 40° C. Further, ethylene was charged in an amount corresponding to 0.3 MPa of gas phase pressure in the autoclave, and after stabilization in the system, 200 mmol of tri-isobutylaluminum, 28 mmol of racemi-ethylenebis(1-indenyl)zirconium diphenoxide, subsequently, 0.2 kg of the above-mentioned co-catalyst carrier (A2) obtained above, were added to initiate polymerization. The mixture was heated up to 50° C. from 40° C. and, previous polymerization for a total time of 4 hours was conducted while continuously feeding ethylene and hydrogen. After completion of polymerization, ethylene, butane, hydrogen gas were purged and the solvent was filtrated, and the produced solid was dried under vacuum at room temperature, to obtain a catalyst component in which 60 g of polyethylene had been previously polymerized per g of the above-mentioned co-catalyst carrier (A2).

[Polymerization]

Using the polymerized pre-catalyst component obtained above, the hydrogen molar ratio to ethylene in polymerization was regulated in the range from 0.3 to 0.5% and the 1-hexene molar ratio to ethylene was regulated in the range from 1.8 to 2.0% and copolymerization of ethylene and 1-hexene was conducted in a continuous type fluidized bed gas phase polymerization apparatus, in the same manner as in Example 1, to obtain an ethylene-1-hexene copolymer having different MFR. The resulted ethylene-1-hexene copolymer showed physical properties and film appearance as shown in Table 1.

Comparative Example 4

[Catalyst Component]

Preparation of Co-Catalyst Carrier (A3)

Into a nitrogen-purged 5 liter four-necked flask was charged 1.5 liter of tetrahydrofuran and 1330 ml (2.7 mol) of a hexane solution of diethylzinc (2 mol/liter), and the mixture was cooled to 5° C. or under. Into this, a solution prepared by dissolving 0.2 kg (1.1 mol) of pentafluorophenol in 340 ml of tetrahydrofuran was dropped over 60 minutes. After completion of dropping, the mixture was stirred at 5° C. for 1 hour, and at 45° C. for 1 hour. Then, the temperature was lowered to 20° C. in an ice bath, then, 45 g (2.5 mol) of water was dropped over 90 minutes. As a result, yellow-white slurry was formed in the flask. After completion of dropping, the mixture was stirred for 1 hour and heated up to 45° C., then, further stirred for 1 hour. The mixture was allowed to stand still overnight at room temperature, then, the liquid substance and solid substance were classified into flasks respectively purged with nitrogen, and the volatile component was distilled off, and the remainder was dried under reduced pressure at 120° C. for 8 hours. As a result, 0.20 kg of a solid product derived from the liquid substance and 0.23 kg of a solid product derived from the solid substance were obtained.

Into a 2 liter four-necked flask purged with nitrogen was charged 0.20 kg of the above-mentioned solid product derived from the solid substance synthesized above, 1.4 liter of tetrahydrofuran, and 0.14 kg of silica heat-treated at 300° C. under nitrogen flow (Sylopol 948 manufactured by Devison; fine pore capacity=1.61 ml/g; specific surface area=306 m$^2$/g, average particle size=59 μm), and the mixture was stirred at 40° C. for 2 hours. The silica-derived component was precipitated, and the upper layer, slurry component was removed, then, the remaining liquid portion was removed by a glass filter. To this was added 1.4 liter of tetrahydrofuran, and the mixture was stirred, then, the silica-derived component was precipitated, and the upper layer, slurry component was removed, then, the remaining liquid portion was removed by a glass filter. The above-mentioned washing operation was repeated five times in total. Thereafter, drying at 120° C. was conducted for 8 hours under reduced pressure, to obtain 0.27 kg of a co-catalyst carrier (A3) having flowability.

[Preparation of polymerization pre-catalyst]

Into a previously nitrogen-purged autoclave having a content volume of 210 liter equipped with a stirrer was charged 100 liter of butane containing tri-isobutylaluminum at a concentration of 2.5 mmol/liter, and 100 liter of hydrogen under normal temperature and normal pressure, then, the autoclave was heated up to 40° C. Further, ethylene was charged in an amount corresponding to 0.2 MPa of gas phase pressure in the autoclave, and after stabilization in the system, 200 mmol of tri-isobutylaluminum, 36 mmol of racemi-ethylenebis(1-indenyl)zirconium diphenoxide, subsequently, 0.25 kg of the above-mentioned co-catalyst carrier (A3) obtained above, were added to initiate polymerization. The mixture was heated up to 50° C. from 40° C. and, previous polymerization for a total time of 4 hours was conducted while continuously feeding ethylene and hydrogen. After completion of polymerization, ethylene, butane, hydrogen gas were purged, then, the solvent was filtrated, and the produced solid was dried under vacuum at room temperature, to obtain a catalyst component in which 39 g of polyethylene had been previously polymerized per g of the above-mentioned co-catalyst carrier (A3).

[Polymerization]

Using the polymerized pre-catalyst component obtained above, copolymerization of ethylene and 1-hexene was conducted in a continuous type fluidized bed gas phase polymerization apparatus under conditions of a hydrogen molar ratio to ethylene in polymerization of 0.2% and a 1-hexene molar ratio to ethylene of 1.9%, in the same manner as in Example 1. The resulted ethylene-1-hexene copolymer showed physical properties and film appearance as shown in Table 1.

Comparative Example 5

[Catalyst component]

A reactor made of SUS having a content volume of 180 liter equipped with a stirrer and jacket was purged with nitrogen, then, 9.7 kg of silica heat-treated at 300° C. under nitrogen flow (Sylopol 948 manufactured by Devison; fine pore capacity=1.65 ml/g; specific surface area=298 m$^2$/g, average particle size=58 μm) and 100 liter of toluene were added. After cooling to 2° C., 23.3 kg (75.9 mol per Al) of a toluene solution of PMAO (PMAO-s manufactured by Tosoh Finechem) was dropped over 62 minutes. After completion of dropping, the mixture was stirred at 5° C. for 30 minutes, heated up to 95° C. over 2 hours, and stirred for 4 hours at 95° C. Thereafter, the temperature was lowered to 40° C., and carried to a reactor made of SUS purged with nitrogen having a content volume of 180 liter equipped with a stirrer and jacket. The silica-derived component was precipitated over 50 minutes, and the upper layer, slurry component was removed. Thereafter, 100 liter of toluene was added and the mixture was stirred for 10 minutes, then, precipitation was caused over about 45 minutes, and the upper layer, slurry component was removed. The above-mentioned washing operation was repeated three times in total. Next, the slurry was carried to a filter apparatus made of SUS having a content volume of 430 liter purged with nitrogen equipped with a filter, stirrer and jacket, with 120 liter of toluene. Stirring was conducted for 10 minutes and filtration was conducted, 100 liter of toluene was added and the mixture was again stirred for 10 minutes, and filtration was conducted. Further, 100 liter of hexane was added and the mixture was stirred for 10 minutes, and filtration was conducted. This washing operation was repeated twice in total. The slurry was carried to a drying apparatus made of SUS having a content volume of 210 liter purged with nitrogen equipped with a stirrer and jacket, with 70 liter of hexane. Next, drying under nitrogen flow was conducted for 7.5 hours at a jacket temperature of 80° C., to obtain 12.6 kg of a catalyst component (S).

[Preparation of polymerization pre-catalyst]

Into a previously nitrogen-purged autoclave having a content volume of 210 liter equipped with a stirrer was charged 120 liter of butane containing tri-isobutylaluminum at a concentration of 2.5 mmol/liter, and 40 liter of hydrogen under normal temperature and normal pressure, then, the autoclave was heated up to 47° C. Further, ethylene was charged in an amount corresponding to 0.3 MPa of gas phase pressure in the autoclave, and after stabilization in the system, 300 mmol of triisobutylaluminum, 15 mmol of racemi-ethylenebis(1-indenyl)zirconium diphenoxide, subsequently, 0.25 kg of the above-mentioned catalyst carrier (S) obtained above, were added to initiate polymerization, and previous polymerization for a total time of 4 hours was conducted while continuously feeding ethylene and hydrogen. After completion of polymerization, ethylene, butane, hydrogen gas were purged, then, the produced solid was dried under vacuum at room temperature, to obtain a catalyst component in which 33 g of polyethylene had been previously polymerized per g of the above-mentioned catalyst component (S).

[Polymerization]

Using the previously polymerized catalyst component obtained above, copolymerization of ethylene and 1-hexene was conducted in a continuous type fluidized bed gas phase polymerization apparatus under conditions of a hydrogen molar ratio to ethylene in polymerization of 0.15% and a 1-hexene molar ratio to ethylene of 1.8%, in the same manner as in Example 1. The resulted ethylene-1-hexene copolymer showed physical properties and film appearance as shown in Table 1.

TABLE 1

| | Example | | | | | Comparative Example | | | | |
|---|---|---|---|---|---|---|---|---|---|---|
| | 1<br>Type I s<br>GPE1766 | 2<br>Type I s<br>GPE1767 | 3<br>Type I<br>I211201 | 4<br>Type I<br>I211203 | 5<br>Type I<br>I28206 | 1<br>ZnGMH<br>GPE1581 | 2<br>ZnGMH<br>GPE1583 | 3<br>ZnGMH<br>GPE1616 | 4<br>ZnGMH<br>GPE1627 | 5<br>SiO$_2$MAO<br>GPE1605 |
| Melt flow rate (MFR)<br>(g/10 minutes) | 1.65 | 1.83 | 2.18 | 2.15 | 1.93 | 0.78 | 1.85 | 6.14 | 2.03 | 2.23 |
| Density (kg/m$^3$) | 921.2 | 921.0 | 918.8 | 919.1 | 920.2 | 922.4 | 920.1 | 920.4 | 923.5 | 919.6 |
| Melt tension (MT) (cN) | 3.3 | 3.2 | 2.9 | 3.0 | 3.3 | 3.6 | 3.2 | 1.4 | 2.0 | 2.7 |
| left side of the formula (1) | 1.5 | 1.4 | 1.3 | 1.3 | 1.4 | 2.3 | 1.4 | 0.7 | 1.3 | 1.2 |
| right side of the formula (1) | 14.9 | 14.0 | 12.6 | 12.7 | 13.6 | 23.2 | 13.9 | 6.9 | 13.2 | 12.5 |
| [η] (g/dL) | 1.04 | 1.06 | 0.96 | 0.97 | 0.99 | 1.20 | 1.12 | 0.95 | 1.20 | 1.12 |
| left side of the formula (2) | 0.97 | 0.96 | 0.95 | 0.95 | 0.96 | 1.04 | 0.96 | 0.86 | 0.95 | 0.95 |
| right side of the formula (2) | 1.39 | 1.37 | 1/33 | 1.33 | 1.35 | 1.56 | 1.36 | 1.13 | 1.34 | 1.32 |
| Log A | 3.96 | 3.91 | 3.87 | 3.91 | 3.84 | 4.07 | 4.04 | 4.00 | 4.10 | 4.05 |
| right side of the formula (3) | 4.03 | 4.03 | 4.02 | 4.02 | 4.03 | 4.06 | 4.03 | 3.99 | 4.03 | 4.02 |

TABLE 1-continued

|  | Example | | | | | Comparative Example | | | | |
| --- | --- | --- | --- | --- | --- | --- | --- | --- | --- | --- |
|  | 1<br>Type I s<br>GPE1766 | 2<br>Type I s<br>GPE1767 | 3<br>Type I<br>I211201 | 4<br>Type I<br>I211203 | 5<br>Type I<br>I28206 | 1<br>ZnGMH<br>GPE1581 | 2<br>ZnGMH<br>GPE1583 | 3<br>ZnGMH<br>GPE1616 | 4<br>ZnGMH<br>GPE1627 | 5<br>$SiO_2$MAO<br>GPE1605 |
| τ 0 (sec) | 5.0 | 4.6 | 2.4 | 2.9 | 3.1 | 10.0 | 5.9 | 2.2 | 6.9 | 5.9 |
| right side of the formula (4) | 5.8 | 5.2 | 4.5 | 4.6 | 5.0 | 9.7 | 5.1 | 2.1 | 4.8 | 4.3 |
| E a (kJ/mol) | 54 | 57 | 69 | 67 | 67 | 56 | 55 | 56 | 47 | 41 |
| SR | 1.28 | 1.29 | 1.45 | 1.46 | 1.47 | 1.20 | 1.30 | 1.48 | 1.31 | 1.35 |
| left side of the formula (6) | 1.32 | 1.30 | 1.39 | 1.38 | 1.36 | 1.17 | 1.24 | 1.40 | 1.17 | 1.24 |
| Mw/Mn | 14.6 | 16.6 | 9.2 | 9.6 | 13.4 | 5.3 | 7.2 | 9.8 | 4.3 | 3.9 |
| MFRR | 83 | 80 | 67 | 69 | 75 | 85 | 72 | 54 | 58 | 50 |
| maximum melting point Tmax (° C.) | 121 | 121 | 105 | 104 | 120 | 121 | 122 | 121 | 122 | 120 |
| Fusion Component higher than 118° C. | Exist | Exist | Exist | Exist | Exist | Exist | Exist | Exist | Exist | Exist |
| Impact strength (TI) (kJ/m²) | 950 | 900 | 820 | 280 | 450 | 1100 | 1030 | 750 | 1130 | 1110 |
| Fish eye | ○ | ○ | ○ | ○ | ○ | ○ | ○ | ○ | ○ | X |
| Haze (%) | 9.1 | 8.7 | 6.3 | 7.0 | 8.6 | 26.9 | 17.2 | 14.3 | 35.5 | 16.9 |

The relations of the formula (1), formula (2) and formula (3), or the formula (1), formula (2) and formula (4) either of which is requirements in the present invention were determined from the melt flow rate (MFR), melt tension (MT), intrinsic viscosity ([η]), log A and characteristic relaxation time (τ) and, the impact strength (TI), fish eye and haze of a film, obtained in the above-mentioned examples and comparative examples.

Examples 1 and 2 satisfying the requirements of the present invention are excellent in extrusion molding processability, appearance of an extrusion molded article, impact strength and balance thereof.

In contrast, Comparative Examples 1 and 2 not satisfying the relation of the formula (3) and the relation of the formula (4), either one of which is one of the requirements of the present invention give a film having high haze and insufficient appearance.

Further, Comparative Example 3 not satisfying the relation of the formula (3) and the relation of the formula (4) as described above has low melt tension and insufficient extrusion processability, gives a film having low impact strength and gives a film having high haze and insufficient appearance.

Comparative Example 4 not satisfying the relation of the formula (3) and the relation of the formula (4) as described above has low melt tension and insufficient extrusion processability, and gives a film having high haze and insufficient appearance.

Further, Comparative Example 5 not satisfying the relation of the formula (3) and the relation of the formula (4) as described above has low melt tension and insufficient extrusion processability, gives a film having a lot of fish eyes, and gives a film having high haze and insufficient appearance.

As described in detail above, according to the present invention, an ethylene-α-olefin copolymer can be obtained excellent in extrusion molding processability, appearance of an extrusion molded article, impact strength and balance thereof.

What is claimed is:

1. A copolymer of ethylene and α-olefin of from 4 to 20 carbon atoms having a melt flow rate (MFR) measured at 190° C. under a load of 21.18 N according to JIS K7210-1995 of from 1.4 to 10 g/10 minutes, a melt tension (MT) at 190° C., an intrinsic viscosity ([η]) and a chain length A satisfying following formulas (1) to (3), a melt flow rate ratio (MFRR) of 60 or more that is calculated by dividing the melt flow rate measured at 190° C. under a load of 211.82 N according to JIS K7210-1995 by said MFR measured at 190° C. under a load of 21.18 N, and an activation energy for melt flow of 54 kJ/mol or more, wherein the length A is a chain length at peak position of a logarithm normal distribution curve of a component having the highest molecular weight among logarithm normal distribution curves obtained by dividing a chain length distribution curve obtained by gel permeation chromatography measurement into at least two logarithm normal distribution curves, $$2 \times MFR^{-0.59} < MT < 20 \times MFR^{-0.59} \qquad \text{formula (1)}$$

$$1.02 \times MFR^{-0.094} < [\eta] < 1.50 \times MFR^{0.156} \qquad \text{formula (2), and}$$

$$3.30 < \log A < -0.0815 \times \log(MFR) + 4.05 \qquad \text{formula (3)}.$$

2. The copolymer of ethylene and α-olefin according to claim 1, wherein the activation energy for melt flow of not less than 60 kJ/mol.

3. The copolymer of ethylene and α-olefin according to claim 1, wherein the melt flow rate (MFR) measured at 190° C. under a load of 21.18 N according to JIS K7210-1995 is from 1.65 to 10 g/10 minutes.

4. The copolymer of ethylene and α-olefin according to claim 1, wherein the copolymer of ethylene and α-olefin has swell ratio (SR) and [η] satisfying the following formula (6) or (7):

$$\text{when } [\eta] < 1.20, \ -0.91 \times [\eta] + 2.232 < SR < 2, \qquad \text{formula (6), and}$$

$$\text{when } [\eta] \geq 1.20, \ 1.17 < SR < 2 \qquad \text{formula (7)}.$$

5. A copolymer of ethylene and α-olefin of from 4 to 20 carbon atoms having:

a melt flow rate (MFR) measured at 190° C. under a load of 21.18 N according to JIS K7210-1995 of from 1.4 to 10 g/10 minutes, melt tension at 190° C. (MT), an intrinsic viscosity [η] and characteristic relaxation time at 190° C. (τ) satisfying the following formulas (1) (2) and 94), a melt flow ratio (MFRR) of 60 or more that is calculated by dividing the melt flow rate measured at 190° C. under a load of 211.82 N according to JIS K7210-1995 by said MFR measured at 190° C. under a load of 21.18 N, and an activation energy for melt flow of 54 kJ/mol or more, $$2 \times MFR^{-0.59} < MT < 20 \times MFR^{-0.59} \quad \text{formula (1)}$$

$$1.02 \times MFR^{-0.094} < [\eta] < 1.50 \times MFR^{0.156} \quad \text{formula (2), and}$$

$$2 < \tau < 8.1 \times MFR^{-0.746} \quad \text{formula (4).}$$

6. The copolymer of ethylene and α-olefin according to claim 5, wherein the activation energy for melt flow of not less than 60 kJ/mol.

7. The copolymer of ethylene and 60-olefin according to claim 5, wherein the melt flow rate (MFR) measured at 190° C. under a load of 21.18 N according to JIS K7210-1995 is from 1.65 to 10 g/10 minutes.

8. The copolymer of ethylene and α-olefin according to claim 5, wherein the copolymer of ethylene and α-olefin has swell ratio (SR) and [η] satisfying the following formula (6) and (7):

$$\text{when } [\eta] < 1.20, \ -0.91 \times [\eta] + 2.232 < SR < 2, \quad \text{formula (6), and}$$

$$\text{when } [\eta] \geq 1.20, \ 1.17 < SR < 2 \quad \text{formula (7).}$$

* * * * *

UNITED STATES PATENT AND TRADEMARK OFFICE
CERTIFICATE OF CORRECTION

PATENT NO.       : 7,141,639 B2                                       Page 1 of 1
APPLICATION NO.  : 10/650035
DATED            : November 28, 2006
INVENTOR(S)      : Yuki Iseki et al.

It is certified that error appears in the above-identified patent and that said Letters Patent is hereby corrected as shown below:

[*] Notice
Delete the statement "This patent is subject to a terminal disclaimer."

Signed and Sealed this

Twelfth Day of June, 2007

JON W. DUDAS
*Director of the United States Patent and Trademark Office*